C. D. ORCUTT.
BRAKE FOR WHEELED VEHICLES OR ROLLER COASTERS.
APPLICATION FILED OCT. 29, 1909.
967,423.
Patented Aug. 16, 1910.
2 SHEETS—SHEET 1.
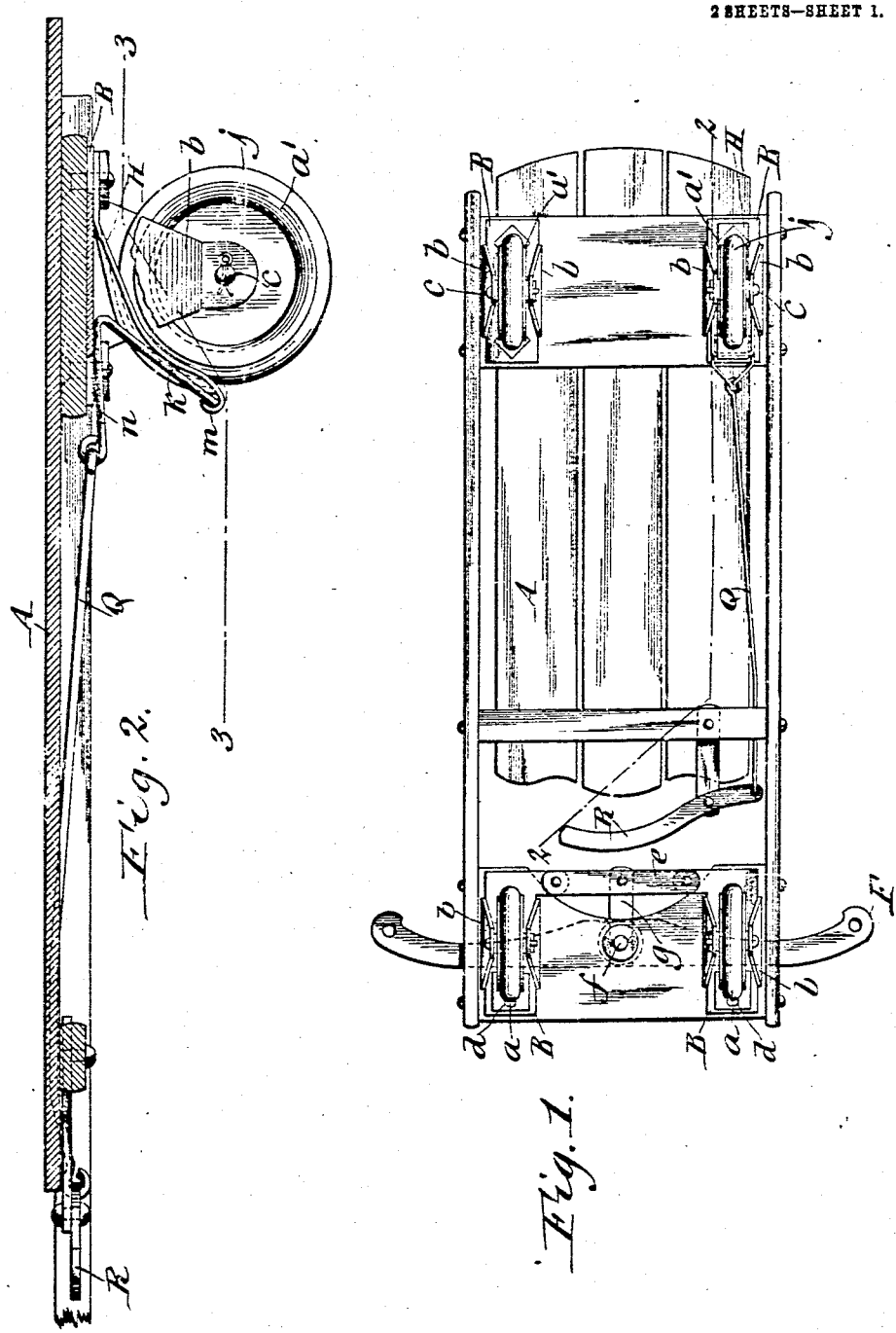

C. D. ORCUTT.
BRAKE FOR WHEELED VEHICLES OR ROLLER COASTERS.
APPLICATION FILED OCT. 23, 1909.
967,423.
Patented Aug. 16, 1910.
2 SHEETS—SHEET 2.
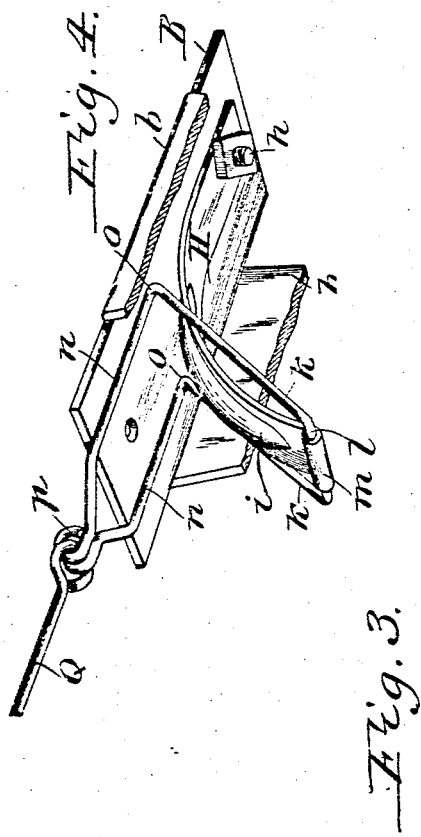
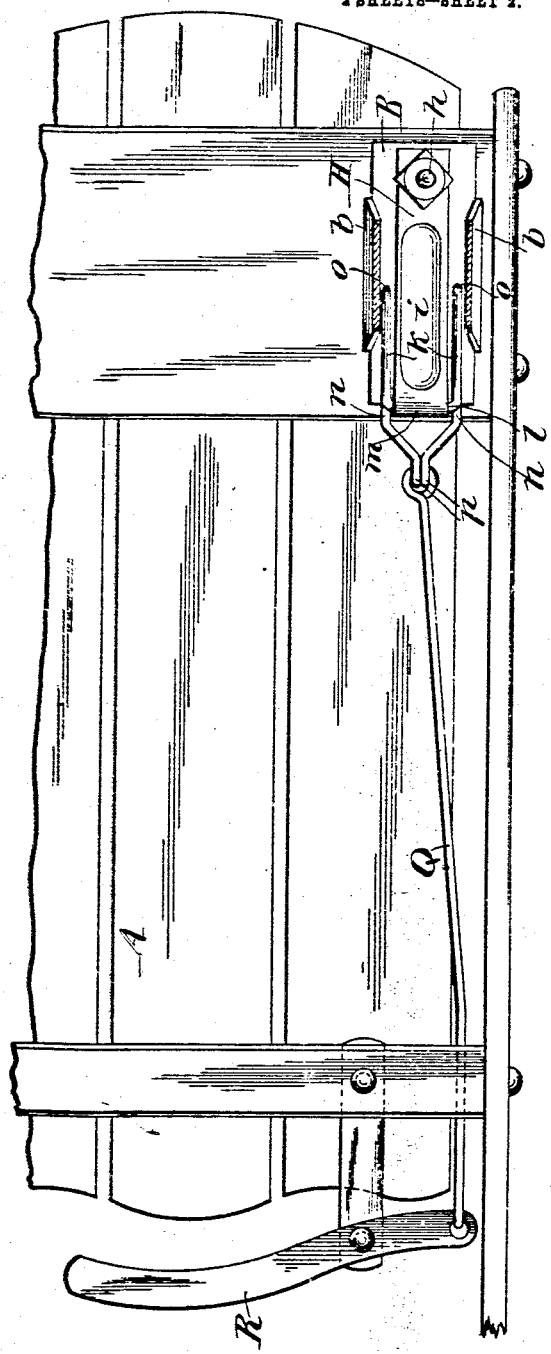
Witnesses:
Richard Sommer.
John H. Shoemaker
Inventor
Charles D. Orcutt
by Geyer & Popp
Attorneys.

UNITED STATES PATENT OFFICE.

CHARLES D. ORCUTT, OF NORTH TONAWANDA, NEW YORK, ASSIGNOR TO BUFFALO SLED COMPANY, OF BUFFALO, NEW YORK, A CORPORATION OF NEW YORK.

BRAKE FOR WHEELED VEHICLES OR ROLLER-COASTERS.

967,423.  Specification of Letters Patent.  Patented Aug. 16, 1910.

Application filed October 29, 1909. Serial No. 525,242.

*To all whom it may concern:*

Be it known that I, CHARLES D. ORCUTT, a citizen of the United States, residing at North Tonawanda, in the county of Niagara and State of New York, have invented new and useful Improvements in Brakes for Wheeled Vehicles or Roller-Coasters, of which the following is a specification.

This invention relates more particularly to a brake for wheeled vehicles or roller coasters which are used by children for amusement and exercise although the same may be also used for this purpose.

This invention has for its object the production of a brake for this purpose which is simple and durable in construction, and which can be produced at comparatively low cost.

In the accompanying drawings consisting of 2 sheets: Figure 1 is a bottom plan view of a wheeled vehicle or roller coaster provided with my improved brake. Fig. 2 is a fragmentary vertical longitudinal section, on an enlarged scale, in line 2—2, Fig. 1. Fig. 3 is a fragmentary sectional bottom plan view taken in line 3—3, Fig. 2. Fig. 4 is a fragmentary sectional perspective view of my improved brake and one of the wheel or roller brackets associated therewith.

Similar letters of reference indicate corresponding parts throughout the several views.

A represents the body or frame of the wheeled vehicle or roller coaster, $a$, $a$ the front steering wheels thereof and $a^1$, $a^1$ the rear supporting wheels. Each of these wheels is mounted in a bracket which consists of an upper horizontal top or head B and two depending arms $b$, $b$ which project downwardly from opposite sides of the head and receive one of the wheels between them. The wheel is pivotally connected with the lower ends of the arms of the particular bracket by means of a pin or axle $c$.

The brackets of the rear supporting wheels are rigidly secured to the underside of the rear part of the vehicle or coaster body but the brackets of the front or steering wheels are connected by vertical pivots $d$ at their front ends with the underside of the front part of the body so that the steering wheels may be turned bodily transversely and horizontally for steering purposes. This steering movement of the front wheels is effected by means of a transverse connecting bar $e$ which is pivoted at opposite ends to the rear ends of the front wheel brackets, a transverse steering bar F pivoted centrally by means of a vertical pin $f$ to the upper side of the body at the front end thereof and a shifting arm $g$ projecting rearwardly from the steering bar at the center thereof and connected with the connecting bar between the ends of the latter.

The wheeled vehicle or roller coaster just described is preferred for receiving my improved brake but my invention is also applicable to other forms of wheeled vehicles and roller coasters.

Although my improved brake may be variously constructed I prefer that shown in the drawings which is as follows:—

H represents a brake shoe which is preferably constructed of curved form from a piece, sheet or strip of steel or other elastic material. This shoe is arranged with its concave side facing the upper front part of one of the supporting wheels and is secured at its rear end to the underside of the adjacent wheel bracket and the upper part of the vehicle or coaster body by means of a bolt $h$, as shown, or by any other suitable means. That part of the brake shoe which faces the periphery of the supporting wheel is preferably provided with a channel $i$ which is concave in cross section so as to fit the round tread or periphery of the rubber tire $j$ on the wheel and operates to apply the pressure of the shoe over a greater area when in engagement with the tire of the wheel, thereby producing not only an effective braking action but also distributing the pressure and wear more uniformly over the tire and prolonging the life thereof.

The construction and arrangement of the brake shoe is such that normally its resilience will cause the free front end of the same to be moved upwardly and out of engagement from the tire of the wheel. For applying the brake, the free front end of the brake shoe is pushed downwardly and into engagement with the periphery of the tire. This downward movement of the brake shoe is effected by means which comprise an elbow lever composed of an inclined lower arm which is pivotally connected at its lower end with the front free end of the brake shoe and a horizontal upper arm which is connected at its rear end with the upper end of the lower arm and forms with the latter an elbow or heel which engages with the underside of the head of the adjacent wheel bracket. In its preferred form the elbow lever is constructed of a single piece of wire which is preferably bent so as to form a pair of lower arm sections $k, k$ arranged on opposite sides of the front part of the brake shoe, a cross bar or pivot pin $l$ connecting the lower ends of the lower arm sections and turning in a tubular bearing $m$ arranged at the lower front end of the brake shoe and preferably formed by curling this part of the brake shoe, and a pair of upper arm sections $n, n$ which have their rear ends connected respectively with the upper ends of the lower arms to form a pair of elbow or heel sections $o, o$ while their front ends converge forwardly and terminate in hooks $p$. The means for operating the elbow lever shown in the drawings comprise a pull rod Q arranged lengthwise of the adjacent part of the body and connected at its rear end with the hooks $p$ on the front end of the upper arm sections of the elbow lever, and a hand lever R pivoted on the front part of the body so as to swing horizontally and connected with the front end of the pull rod.

The resilience of the brake shoe upon raising the elbow lever connected therewith causes the heel or elbow between the upper and lower arms of this lever to slide rearwardly on the underside of the head or top of the adjacent bracket and the pull rod to be drawn rearwardly. In this position of the parts the lower arm of the elbow lever inclines at a considerable angle rearwardly from its lower end to the elbow or heel thereof. Upon turning the hand lever in the direction for moving the pull rod forwardly the upper arm of the elbow lever will be moved forwardly on the top or head of the bracket and the lower arm will be moved into a more vertical position. During this movement of the elbow lever its heel or elbow rides or slides against the underside of the head or top of the adjacent wheel bracket and the straightening of the lower arm of this lever operates to push the free front end of the brake shoe downwardly into engagement with the periphery of the wheel tire, thereby applying a braking effect to this wheel. Upon releasing the hand lever the resilience of the brake shoe as well as the elbow lever which is also preferably constructed of spring material, causes the brake shoe to leave the wheel tire and the arms of the elbow lever to contract and move with its elbow into its rearmost position, thereby pulling the rod rearwardly and restoring the hand lever to its initial position.

The rear parts of the brake shoe and of the elbow lever are arranged between the depending arms of the adjacent wheel bracket, whereby these parts of the brake mechanism are held against lateral displacement and are also covered so as to afford a protection against breakage or injury.

My improved brake is not only very cheap but it is also very effective in operation and not liable to get out of order when in use, thereby rendering the same particularly desirable for roller coasters which at times are subjected to severe strains and rough usage.

I claim as my invention:

1. A brake comprising a brake shoe adapted to bear against the periphery of a wheel, an elbow lever having one arm connected with said shoe and adapted to bear slidingly at its elbow against a support, and operating means connected with the other arm of said elbow lever.

2. A brake comprising a brake shoe adapted to bear against the periphery of a wheel, an elbow lever having two lower arm sections arranged on opposite sides of said shoe, a cross piece connecting the lower ends of said lower arms and pivotally connected with the free end of the shoe, and upper arm sections which are connected at their rear ends with the upper ends of the lower arm sections and form elbows or heels therewith which bear against a fixed support, and operating means connected with the front ends of said upper arm sections.

3. The combination of a coaster body, a bracket secured to the body, a wheel mounted on the bracket, a curved brake shoe arranged between the top of the wheel and the underside of the body and secured at its rear end to the top of said bracket, an elbow lever having its elbow or heel bearing slidingly against the top of said bracket while its lower arm is pivotally connected with the free end of said brake shoe, and means for operating the elbow connected with the upper arm thereof.

4. The combination of a coaster body, a bracket secured to the body, a wheel mounted on the bracket, a curved brake shoe arranged between the top of the wheel and the underside of the body and secured at its rear end to the top of said bracket, an elbow lever having a pair of lower arm sections, a cross piece connecting the lower ends of the lower arm sections and pivoted on the free end of the brake shoe, and a pair of upper arm sections which are connected at their rear ends with the upper ends of the lower arm sections and form heels or elbows therewith which bear slidingly against the top of said bracket, and means for operating said elbow lever.

5. The combination of a coaster body, a bracket secured to the body, a wheel mounted on the bracket, a curved brake shoe arranged between the top of the wheel and the underside of the body and secured at its rear end to the top of said bracket, an elbow lever having a pair of lower arm sections, a cross piece connecting the lower ends of the lower arm sections and pivoted on the free end of the brake shoe, and a pair of upper arm sections which are connected at their rear ends with the upper ends of the lower arm sections and form heels or elbows therewith which bear slidingly against the top of said bracket, and means for operating said elbow lever comprising a hand lever pivoted on said body, and a rod connecting said hand lever with the front end of the upper arm sections of said elbow lever.

Witness my hand this 28th day of October, 1909.

CHARLES D. ORCUTT.

Witnesses:
THEO. L. POPP,
E. M. GRAHAM.